Dec. 26, 1967     R. L. LILLESTRAND ETAL     3,360,638
DYNAMIC SPACE NAVIGATION EMPLOYING STAR OCCULTATION TECHNIQUE
Filed Nov. 28, 1962
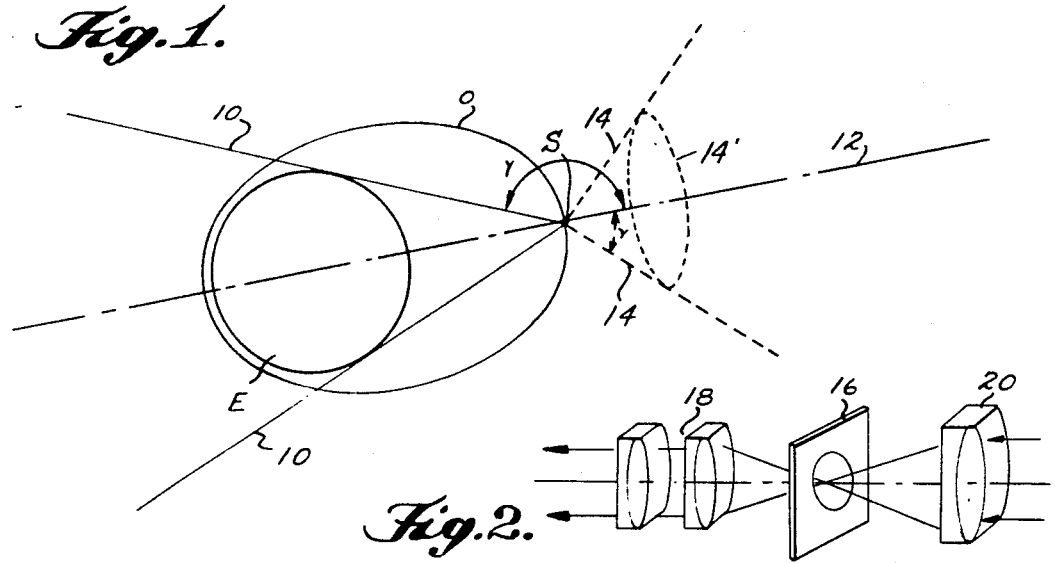
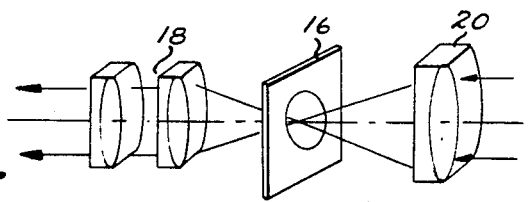
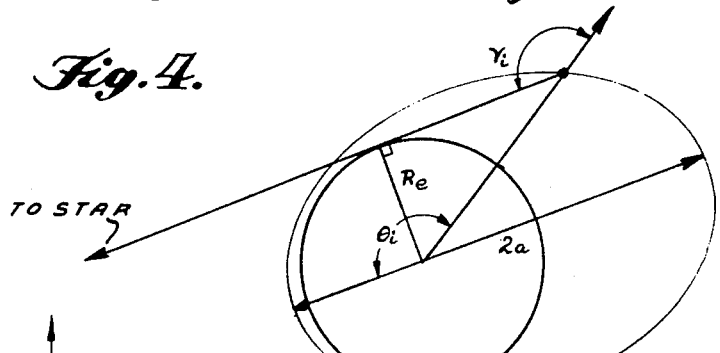
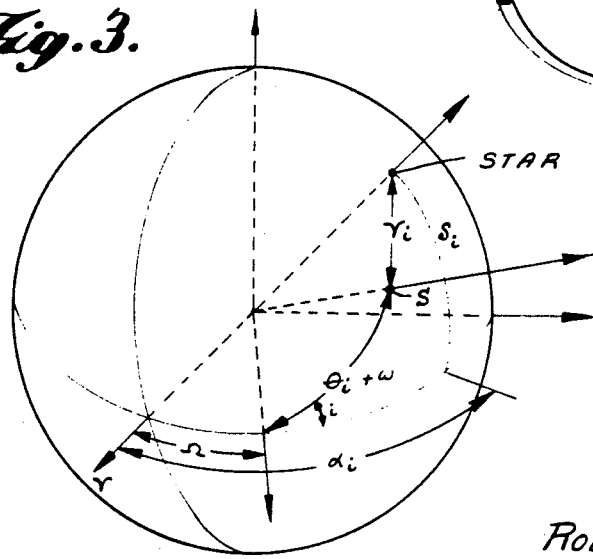
INVENTORS
ROBERT L. LILLESTRAND
JOSEPH E. CARROLL
BY Cushman, Darby & Cushman
ATTORNEYS

United States Patent Office 3,360,638
Patented Dec. 26, 1967

3,360,638
DYNAMIC SPACE NAVIGATION EMPLOYING
STAR OCCULTATION TECHNIQUE
Robert L. Lillestrand, Minneapolis, and Joseph E. Carroll, Hopkins, Minn., assignors to Control Data Corporation, Minneapolis, Minn., a corporation of Minnesota
Filed Nov. 28, 1962, Ser. No. 240,693
5 Claims. (Cl. 235—150.271)

This invention pertains to space navigation and particularly to navigation accomplished by noting the position of the stars in relation to a planet such as the earth.

In accordance with the present invention it has been discovered that the position in space of a vehicle may be ascertained and future positions of the vehicle predicted by recording the time of occultation of a plurality of stars as they cross a curved reference line which has a known relation to the center of the planet and the vehicle.

If an observer on board a craft in space measures the time of passage of various known stars across a curved reference line which is suitably positioned relative to the center of the earth, or some other solar system body, it is possible to collect sufficient data to determine the orbital elements. From the orbital elements the position of the satellite can be calculated as a function of time. At any one point the observer collects insufficient data to completely define his position. However by relating the series of partial positional fixes through the dynamic equations of motion, it is possible to solve the navigational problem. In addition, by utilizing this solution, the future track of the vehicle may be predicted.

The principle object of the invention, therefore, is to provide a new method of space navigation by utilizing the star occultation technique.

Further objects and the entire scope of the invention will become more fully apparent from the following detailed description of illustrative embodiments and from the appended claims. The illustrative embodiment may be best understood by reference to the accompanying drawings, wherein:

FIGURE 1 is a schematic diagram illustrating a space vehicle in orbit about a planet with the appropriate parameters for defining the star occultation geometry being shown;

FIGURE 2 is a schematic diagram of the optical system which may be employed to observe the star occultation;

FIGURE 3 is a schematic diagram illustrating the parameters of spherical trigonometry utilized in the dynamic formula of space vehicle movement;

FIGURE 4 is a schematic diagram illustrating additional parameters utilized in the dynamic formula of space vehicle movement and showing $\gamma_i$ when Method II is employed.

At the outset it will be mentioned that the present system of navigation may be carried out using an artificial horizon (Method I) or the natural horizon of the planet of the planet (Method II). These two methods will be explained together. Also, the earth will be used for convenience as the example of a planet in our solar system in respect to which navigation is carried out.

Now referring to FIGURE 1, a space vehicle S is shown in an arbit path O about Earth E. The solid lines 10 depict a cone with its apex at the vehicle and its axis intercepting the center of E, the sides of the cone being tangent to the surface of E. Thus, in the manner of Method II, it is along any one of the infinite number of lines developing the cone that one aboard the vehicle may observe a star just as it disappears from view (i.e., is completely occulted) behind E.

The chain line 12 is an extension of the axis of cone 10 outwardly beyond the vehicle, and $\gamma_e$ is the angle between said extended axis and one of the surface lines of the cone 10.

Dash lines 14 depict a further cone such as would exist by use of a telescope or wide-angled camera lens in the vehicle having an optical axis coinciding with the extension 12 of the axis extending between the vehicle S and center of E. Here $\gamma$ indicates the semi-angle of cone 14.

FIGURE 2 illustrates how an illuminated reticle 16 between eyepiece 18 and objective 20 may be employed as an imaging system in the vehicle so that a circle on the reticle is available as the equivalent of an image of a reference base 14′ of cone 14. This circle is used as an artificial horizon in noting the passage of a star across the circle (Method I) just as one notes the passage of a star behind the natural horizon of the Earth E (Method II). In the former case the base 14′ may be considered as an artificial horizon just as in Method II the natural horizon of E describes the circular base of a cone at the tangent points between the planet E and the infinite number of lines 10.

It should here be noted that the use of a circle as a mark on the reticle occurs in this preferred embodiment since the axis of the telescope is coincident with the line between the planet and the vehicle. However, it will be understood that this system of navigation is also valid when the telescope's axis is not coincident with, but is displaced by an angle $\gamma$ from, the planet-vehicle line. In such a case, the mark on the reticle is drawn such that all points thereof are at an angle $\gamma$ from this line.

In FIGURE 1 the semi-angle of cone 14 is denoted $\gamma$. The angle $\gamma_e$ is a special case of the angle $\gamma$ in which the cone is tangent to the planet. It will become apparent that the angle $\gamma$ may in fact be any value greater than 0° but greater than 180°. (When $\gamma$ is greater than $\gamma_e$, bright sources of light on the ground may be used as reference sources rather than stars.)

Several methods are known for determining within a space vehicle the direction from the vehicle to the center of the earth. Devices such as horizon sensors or gravity gradient detectors have been used and are being proposed for this purpose. Accordingly, the ability to ascertain the conical axes by means within the vehicle is not further discussed herein.

In the navigation system herein described the attitude requirements for the vehicle necessitate that it be roll and pitch stabilized in order that the direction from the vehicle to the planet or other solar system body may be determined. However, there is no yaw stabilization required.

Assuming that the space vehicle is on a Keplerian orbit about a solar system body whose gravitational force field is spherically symmetric, some of the parameters of the orbit may be illustrated by reference to a celestial sphere, as shown in FIGURE 3, having its center corresponding with the center of the planet, which will here be considered as the earth.

Referring to FIGURES 1 and 3 jointly, at the instant of time when a given star (e.g. the $i$th star) is seen to enter the reticle circle (Method I) or to disappear or occult behind the natural horizon of E (Method II), a geometrical relationship as shown in FIGURE 3 results. The position of the $i$th star is indicated on the celestial sphere as the right ascension ($\alpha_i$) measured along the equator and the declination ($\delta_i$) measured up from the equator. Of course, these quantities are accurately known for at least 70 stars which are positionally identifiable for navigational purposes. The position of vehicle S is given by the inclination of the orbit ($i$), by the longitude of the ascending node ($\Omega$), and by the argument of the perigee ($\omega$), and the true anomaly ($\theta_1$). As will be realized, $\theta_1$ is itself a function of the remaining orbit parameters ($e$, $a$, $T_p$) and the time where $e$=eccentricity of the orbital ellipse; $T_p$=time of passing perigee; and $a$=the semi-major axis of the orbital ellipse).

In FIGURE 3, $\gamma_1$ is the angle between the position of the observer and that of the star. If Method I is used, $\gamma_1$ is a constant; if Method II is employed, $\gamma_1$ is a function of the as yet unknown orbital parameters. By means of spherical trigonometry it can be shown that for either case the following relation exists between the quantities shown in FIGURE 3:

$$\cos \gamma_i = \cos \delta_i \cos (\alpha_i - \Omega) \cos (\theta_i + \omega)$$
$$+ \sin \delta_i \sin i \sin (\theta_i + \omega)$$
$$+ \cos \delta_i \cos i \sin (\theta_i + \omega) \sin (\alpha_i - \Omega)$$

where subscript $i = 1, 2 \ldots 6$, and it is recognized that $\theta_1$ can have two values for the transit of a given star. Since the observer will know his approximate position this source of ambiguity can easily be resolved.

Since there are six unknowns in the foregoing dynamic equation, it will be necessary to make six horizon star transit time measurements thereby yielding 6 equations similar to the above. This system of equations can then be solved for the six unknowns. This is a highly transcendental set of equations, and their solution requires making an initial estimate of the orbital elements and then solving for the errors in the initial estimate through a process of successive approximation. While the computation may be performed manually, experience in solving these equations indicates that it is sufficiently complicated to warrant the use of a digital computer.

The true anomaly, $\theta_1$ is a function of three orbital elements ($e$, $T$, $T_p$) and time, $e$=eccentricity of orbital ellipse; $T$=period of orbit (a function of $a^{3/2}$); and $T_p$=time of passing perigee. Thus, one must make the following substitutions in the dynamic equation in order to arrive at a solution $$\theta_i = M_i + 2e \sin M_i + \tfrac{5}{4} e^2 \sin 2M_i + \cdots$$

where $$M_i = 2\pi \left( \frac{t_i - T_p}{T} \right)$$

The unknowns in the dynamic equation are therefore $\Omega$, $i$, $\omega$, $T$, $e$, $T$. The known qualities are $\alpha_i$ and $\delta_i$, which vary for each star and the measured quantity is $t_i$, the time of occultation of the $i$th star. As stated previously, the quantity $\gamma_i$ is a constant for the case illustrated in Method I (artificial horizon employed). For the natural horizon case (Method II) the value of $\gamma_i$ will be different for each star and will vary according to the following equation:

$$\gamma_i = \pi - \sin^{-1} \left( \frac{a}{R_e} \right) \left( \frac{1 - e^2}{1 + e \cos \theta_i} \right)$$

The quantities in this equation are defined in FIGURE 4.

To refine the actual orbit determination, the above equations should, of course, also contain additional terms because of the aspheric shape of the earth, because of the atmospheric corrections used since the transit occurs above the surface of the earth, and because of the secular and periodic variations in the orbital elements which arise from the earth's aspheric shape.

The position of the space vehicle may be ascertained in the methods of the present invention by utilizing the six determinations of star occultation times. In the embodiment of Method I, this may be accomplished by utilizing two crossings of a single star on the circle of the reticle 16 as two of the occultation times since the star is constantly in view. However, this is impractical in Method II since the planet obscures the star during the period between the first occultation time behind the natural horizon and the time of its re-appearance. It would be very difficult to accurately record the time of re-appearance. Accordingly, the occultation times of six different stars is preferable in Method II.

The occultation referred to thus far has been complete occultation. However, it is to be understood that the occultation may be partial such as is caused by attenuation of atmosphere surrounding the reference planet. Apparatus for detecting partial occultation is disclosed in the application Ser. No. 255,295 of R. L. Lillestrand, W. M. Hilt and D. C. Harrington filed Jan. 31, 1963, now Patent 3,274,880.

The six occultation time determinations may be supplied to a general purpose computer programmed with the parameters of the solar system. Using these six recordings of occultation time, the computer can solve the dynamic equations to locate the vehicle in space and can also extrapolate to predict its location at a future time.

In order to realize the full accuracy potential of the proposed navigational system, periodic updating will be necessary. In its simplest form this involves the transit time measurement of a single star which lies in or near the orbit plane. This type of updating will be particularly useful when atmospheric drag produces an unknown deceleration of the vehicle. In its most complex form, periodic updating will involve the addition of the most recent transit time data, with appropriate statistical weight factors, to already existing data in order to make a new determination of the orbital elements. More frequent updating will be necessary for low-altitude orbits, because the effects of the earth's oblateness and atmosphere are stronger.

If the accuracy of the orbit prediction is reduced to one mile, the prediction is valid for three or four days. From this it appears that updating will be relatively infrequent under certain conditions; however, as the accuracy requirement is increased, or the satellite altitude reduced, the ability of the digital computer to provide frequent updating of the orbit becomes increasingly important.

Although the movement of the space vehicle referred to herein has been in an orbital path and the dynamic equations developed have been related to an orbital movement, it will be understood that the method of space navigation herein disclosed is equally appropriate to any path of travel for which one knows the force field.

The methods and devices disclosed herein are examples of arrangements in which the inventive features of this disclosures may be utilized, and it will be readily apparent to one skilled in the art that certain modifications may be made within the spirit of the invention as defined by the appended claims.

What is claimed is:

1. A method for determining the orbit of a vehicle moving in space relative to a known planet or other solar system body, comprising the steps of:

directing an optical imaging system on board said vehicle to encompass a field of view always including a reference mark having a definite positional relationship with respect to said planet and a recognizable source of star radiation;

recording the time of transit of said radiation source past the reference mark while the optical imaging system is so directed;

repeating the foregoing step of recording the time of transit of a radiation source at least five additional times; and computing a result indicative of the orbit of the vehicle utilizing the recorded times of transit in equations containing orbital parameters, each parameter being functionally dependent on the known right ascension and declination, as well as the transit time, of the recognized stars.

2. A method as in claim 1 wherein the reference mark is the actual horizon of the planet or other solar-system body which is being orbited.

3. A method as in claim 1 wherein the reference mark comprises a circle in a plane transverse to a straight line between said vehicle and the center of said planet or other solar-system body, said straight line passing through the center of said circle.

4. A method as in claim 1 wherein the reference related to the solar-system body is the actual horizon of said body as manifested by the stars' radiation being modified to a predetermined extent by said body including any atmosphere thereabout.

5. A method as in claim 1 wherein the reference related to the solar-system body is a mark established in the vehicle which mark has a known position with reference to the line of direction between the vehicle and the center of the body, the reference being at least a portion of a circle lying in a plane which is transverse to said line of direction from the vehicle to the center of said body.

References Cited

UNITED STATES PATENTS

| | | | |
|---|---|---|---|
| 2,857,672 | 10/1958 | McCoy | 235—150.271 X |
| 3,012,728 | 12/1961 | Marner | 235—150.271 |
| 3,107,294 | 10/1963 | Sholtz | 235—150.271 |
| 3,172,108 | 3/1965 | McClure | 235—150.271 X |
| 3,191,176 | 6/1965 | Guier | 235—150.271 X |
| 3,048,352 | 8/1962 | Hansen | 250—203 X |
| 3,090,583 | 5/1963 | Behun et al. | 244—14 |
| 3,194,949 | 7/1965 | Jasperson | 235—150.27 |
| 3,205,362 | 9/1965 | Dryden | 250—203 |
| 3,206,605 | 9/1965 | Johns | 250—203 |
| 3,227,397 | 1/1966 | Good et al. | 250—203 X |
| 3,235,734 | 2/1966 | Lozins | 250—203 |
| 3,239,165 | 3/1966 | Sohn | 244—1 |

MALCOLM A. MORRISON, *Primary Examiner.*

M. P. HARTMAN, *Examiner.*

I. KESCHNER, *Assistant Examiner.*